O. M. WATSON.
LOCK NUT FOR BOLTS.
APPLICATION FILED AUG. 21, 1911.
1,019,387.
Patented Mar. 5, 1912.
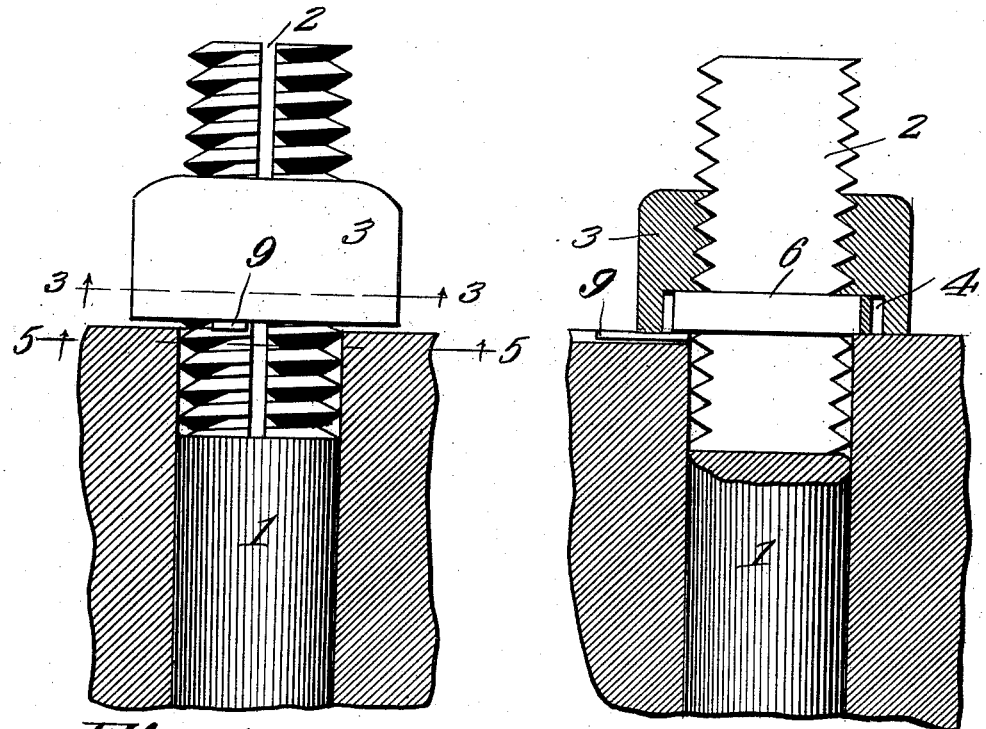
Fig. 1.　　Fig. 2.
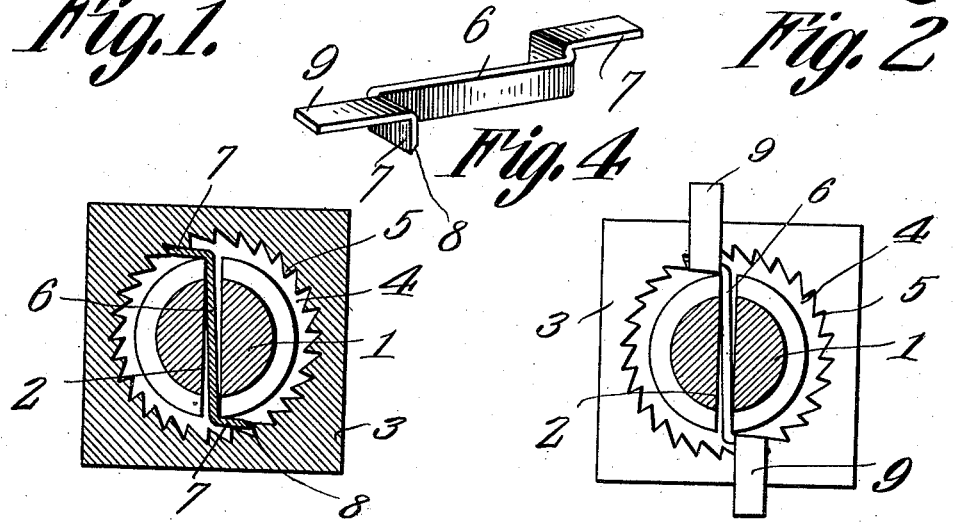
Fig. 3.　　Fig. 5.
Fig. 4.
Orra M. Watson
Inventor,
Witnesses
Frank B. Woodew.
L. H. Wilson.
by C. A. Snow & Co.
Attorneys.

UNITED STATES PATENT OFFICE.

ORRA M. WATSON, OF DALLAS CITY, ILLINOIS.

LOCK-NUT FOR BOLTS.

1,019,387.   Specification of Letters Patent.   Patented Mar. 5, 1912.

Application filed August 21, 1911. Serial No. 645,077.

*To all whom it may concern:*

Be it known that I, ORRA M. WATSON, a citizen of the United States, residing at Dallas City, in the county of Hancock and State of Illinois, have invented a new and useful Lock-Nut for Bolts, of which the following is a specification.

This invention relates to improvements in lock-nuts for bolts.

The invention has for its object to provide for effectively securing the nut upon its bolt as against possible casual displacement from the transmission of a jarring action or concussions to said nut.

A further object is to carry out the aforesaid ends in a simple, effective and inexpensive manner.

The invention consists of certain instrumentalities and features substantially as hereinafter fully disclosed and defined by the claims.

In the accompanying drawing, illustrating the preferred embodiment of my invention wherein numerous changes and modifications may be made as to the details of the construction and arrangement of the parts without departing from the spirit of my invention, Figure 1 is an elevational view of the same. Fig. 2 is a sectional elevation thereof. Fig. 3 is a transverse section taken on the line 3—3 of Fig. 1. Fig. 4 is a detached perspective of the retaining or locking member or dog. Fig. 5 is also a transverse section taken on the line 5—5 of Fig. 1, viewing upwardly.

In practicing my invention, I provide a bolt 1 with an axial slot or slit 2, which longitudinally severs the threaded portion thereof about centrally. A nut 3, suitably screwing upon the threaded portion of said bolt has its inner surface formed with a circular recess 4 whose walls are suitably notched, serrated or toothed forming a ratchet surface thereon, as at 5, for a purpose presently seen. A dog or locking member 6 of peculiar construction, preferably as disclosed particularly by Fig. 4, the same being of substantially Z-shape, or zigzag in outline, adapted to be inserted into the slit or slot 2 of the bolt 1, this being done previous to placing the nut in position upon the bolt. The dog or locking member 6 is received within the annular or circular recess 4 of the nut 3, the end portions thereof 7, standing about tangentially to the annular contour of the bolt and suitably pointed or beveled as at 8 for engagement with the ratchet surface 5 of the walls of said recess, said dog or member having sufficient resiliency to cause the pointed or beveled ends thereof to automatically engage or spring into the serrations or notches of said ratchet surface as the nut is screwed upon the bolt to the maximum extent, thus providing for securing the nut in locked position. The opposite end portions of said dog are provided with lugs or projections 9, outstanding from the lateral edges thereof, so as to be out of alinement with the dog or member 6 and to extend beyond the nut, for their ready engagement by the hand or fingers in conveniently inserting the dog into the slot or slit of the bolt, or its removal.

It is apparent from the foregoing disclosure, taken in connection with the accompanying illustration, that my invention is extremely simple, embracing but the minimum parts, therefore inexpensive of manufacture, while it is readily applied for use and is effective in action.

What is claimed is:—

1. A nut-lock, including an axially slotted bolt, a nut engaging said bolt and having an annular recess therein, whose walls are formed with a ratchet-surface, and a dog received by the slot of said bolt and adapted to engage the ratchet-surface of said nut, said dog having a lug outstanding therefrom out of alinement with the dog.

2. A nut-lock, including an axially slotted bolt, a nut having a ratchet-surfaced recess and a dog of zigzag outline received by the slot of said bolt, with end portions thereof standing tangentially to the surface of the bolt and adapted to engage the ratchet surface of the recess of said nut, the end-portions of said dog having lugs outstanding therefrom, out of alinement with the dog.

3. A nut-lock including an axially slotted bolt, a nut having an annular recess whose walls are formed with a ratchet surface, and a dog of approximately L-shaped outline received bodily and transversely within the slot of the bolt, the terminals of which dog extend tangentially to the surface of the bolt and in opposite directions to engage said ratchet-surface of the nut, said terminals of the dog having lugs projecting at right-angles from the upper edges thereof.

In testimony that I claim the foregoing as my own, I have hereto affixed my signature in the presence of two witnesses.

ORRA M. WATSON.

Witnesses:
 WILLIAM H. DAMRON,
 FRED E. PYLE.

Copies of this patent may be obtained for five cents each, by addressing the "Commissioner of Patents, Washington, D. C."